United States Patent Office 2,941,357
Patented June 21, 1960

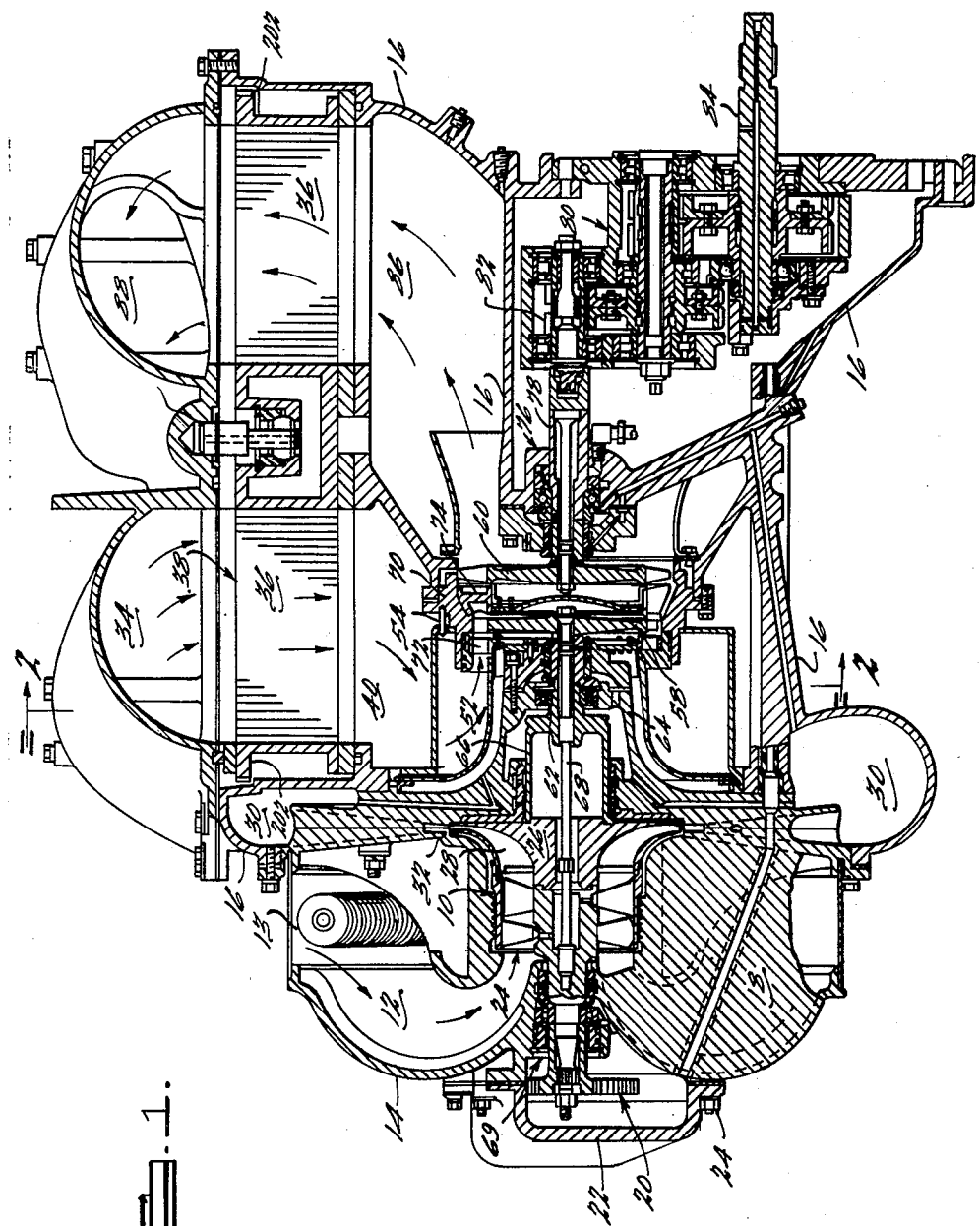

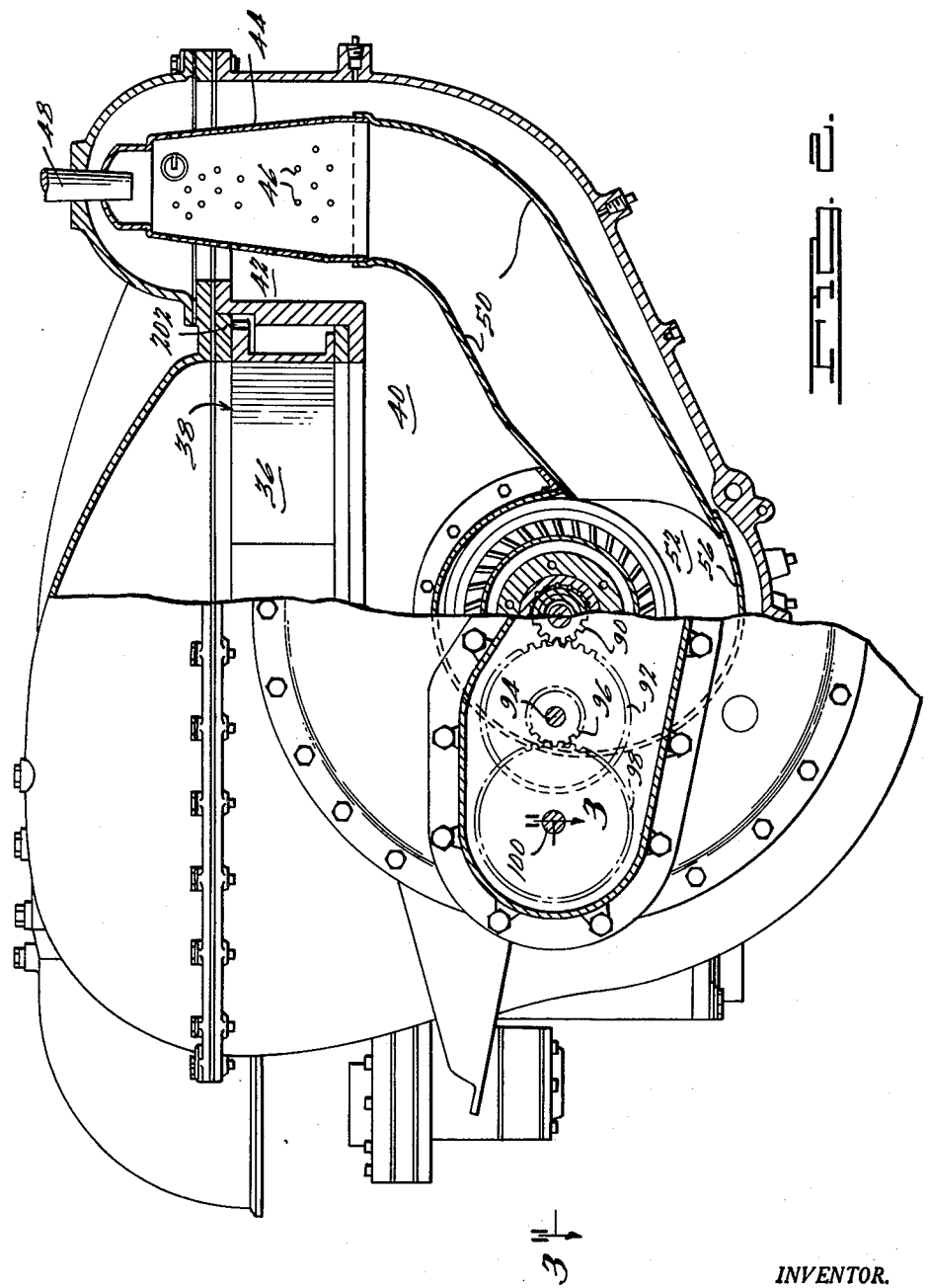

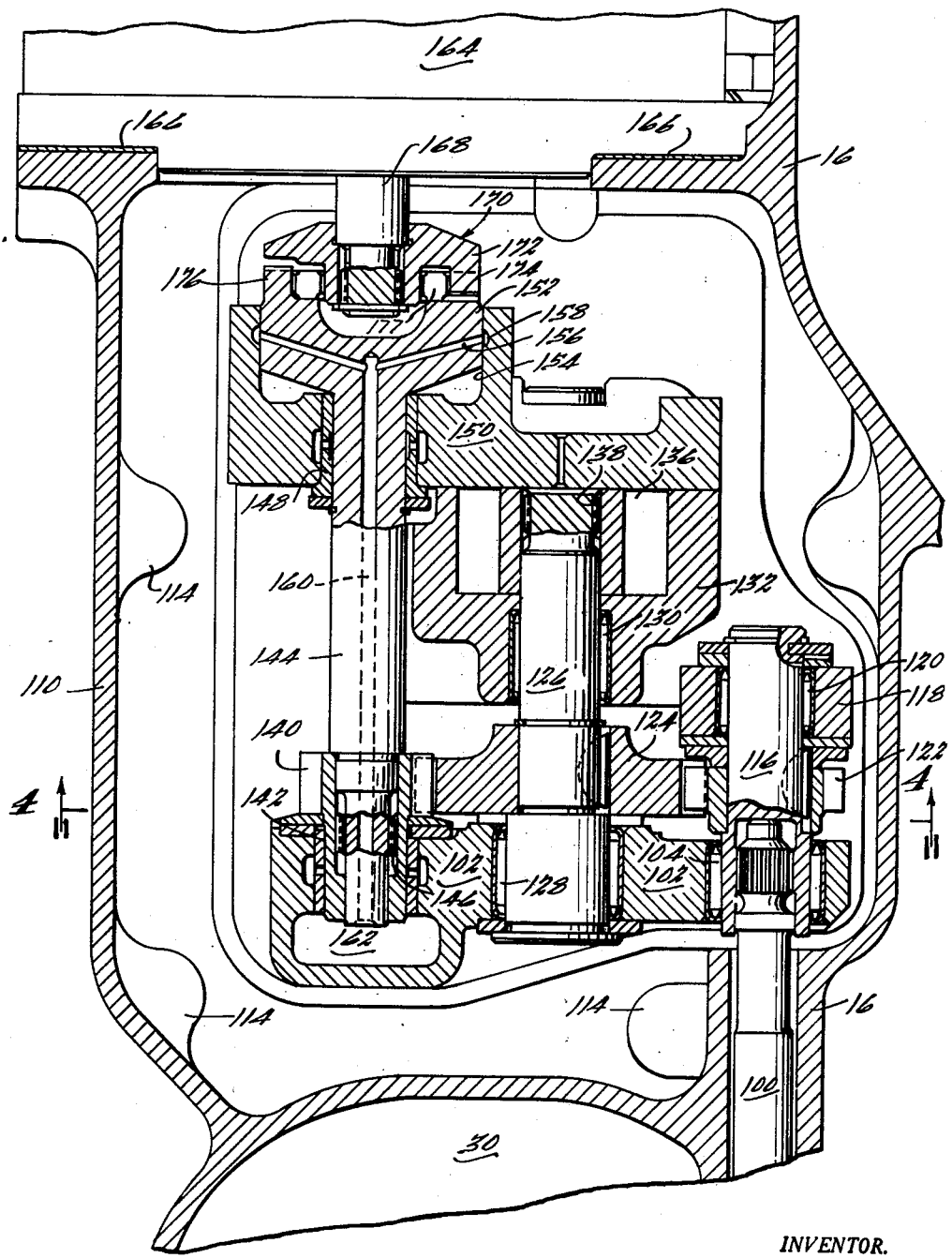

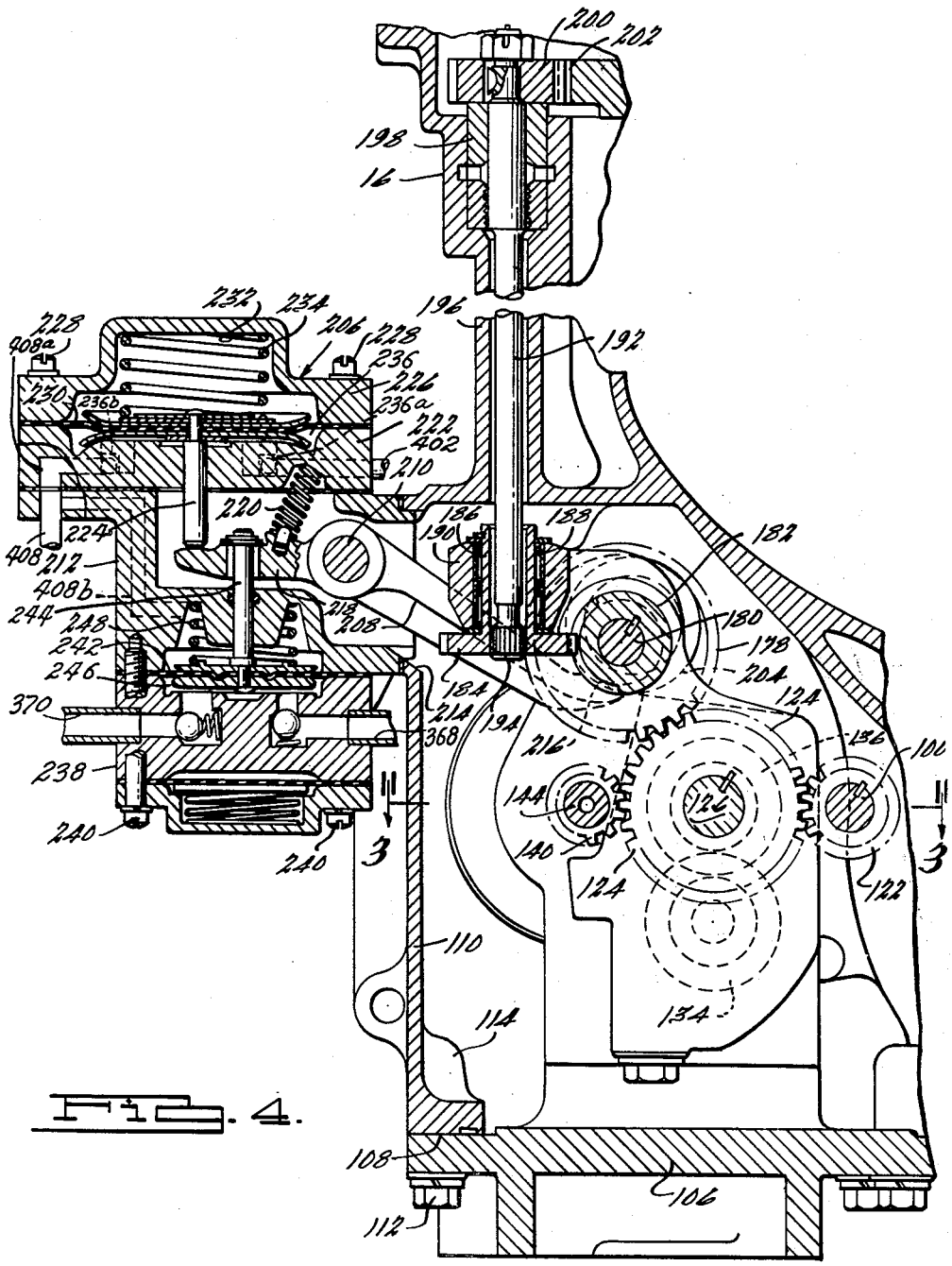

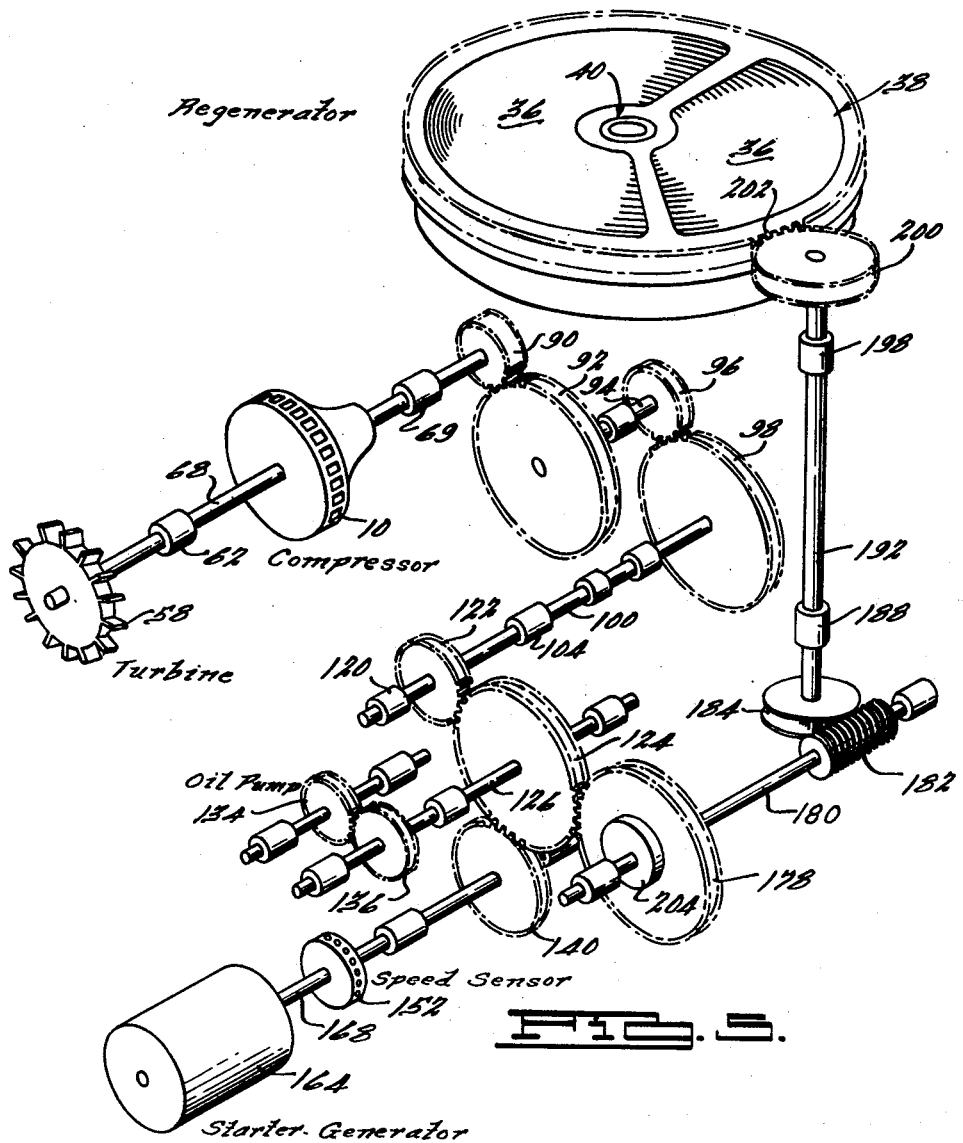

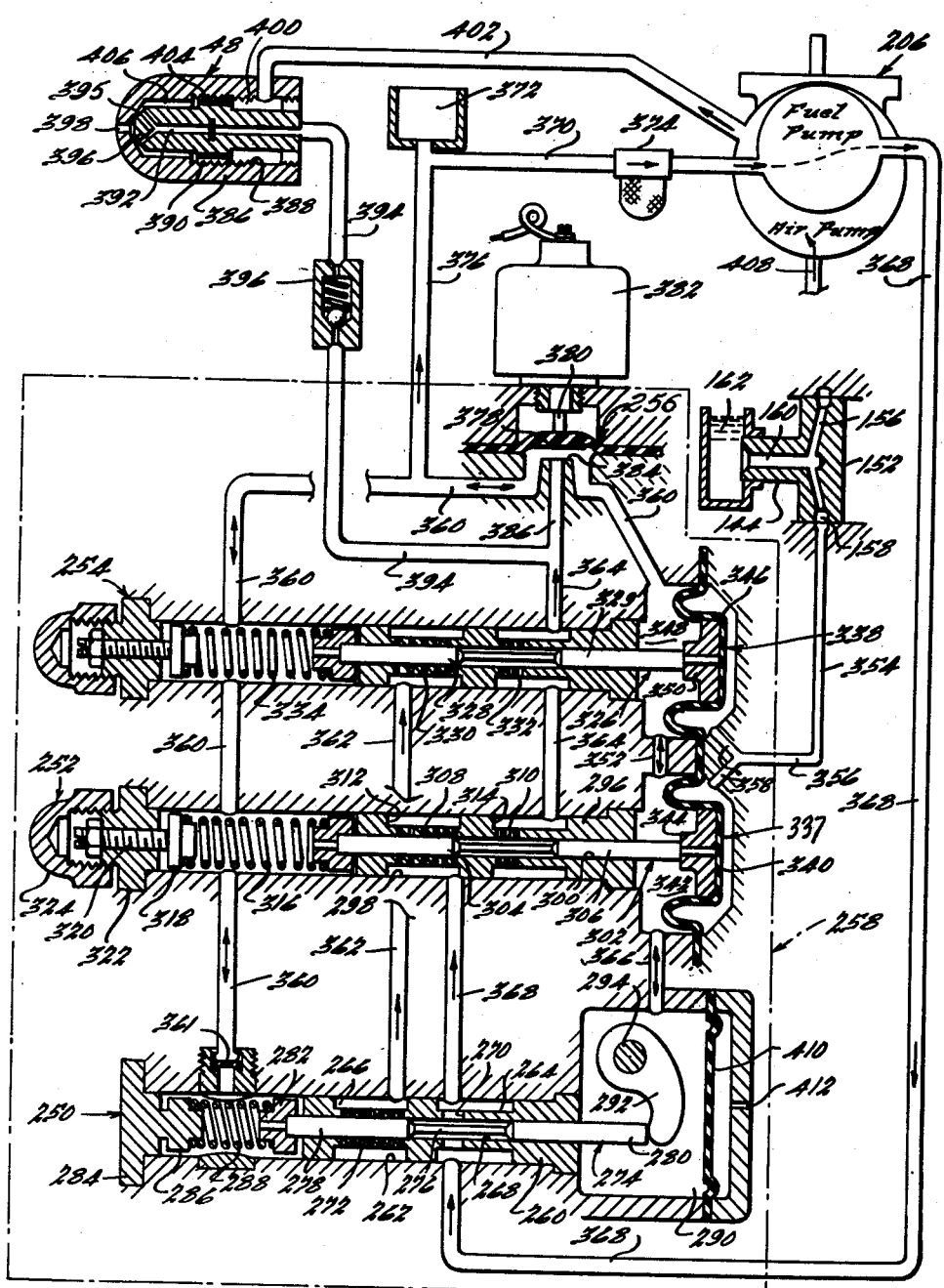

2,941,357

FUEL CONTROL VALVE MECHANISM FOR USE WITH A GAS TURBINE POWER PLANT OR THE LIKE

David W. Barton, Birmingham, Mich., assignor to Chrysler Corporation, Highland Park, Mich., a corporation of Delaware Filed May 10, 1954, Ser. No. 428,501

5 Claims. (Cl. 60—39.28)

My invention is related to gas turbine power plants having a burner for producing motive gases and having one or more turbine stages adapted to be powered by the motive gases. More particularly, my invention comprises a fuel control mechanism for scheduling a controlled flow of liquid fuel to the burner in response to variations in at least one of the operating parameters of the gas turbine.

The provision of a fuel control system for a gas turbine power plant as above set forth being a principal object of my present invention, another object of my invention is to provide a means for operatively associating the components of the control system with the power plant assembly, said components including a means for automatically actuating movable fuel control valve elements within the control system in response to variations in the operating speed of the power plant.

Another object of my invention is to provide a fuel control system for use with a gas turbine power plant, as above described, said fuel control system including valve means for metering and scheduling a predetermined quantity of fuel to the gas turbine burner during starting. I further propose to adapt this valve means to function as a turbine speed governing valve during idling operation of the power plant.

Another object of my present invention is to provide a fuel control means, as set forth in the preceding object, which further includes another valve means for metering and scheduling a controlled quantity of liquid fuel to the gas turbine burner during acceleration of certain of the rotary turbine elements of the power plant thereby maintaining an optimum fuel-air ratio in the power plant burner. I further propose to adapt this other valve means to function as a speed governing valve to limit the maximum turbine speed to a predetermined value.

A further object of my present invention is to provide a fuel control system as set forth in the preceding objects, wherein a manually controlled throttle valve may be provided for regulating and throttling the flow of fuel to the power plant burner, the above mentioned scheduling valve means being operative in response to variations in the speed of certain of the rotary turbine elements of the power plant to retard the throttled fuel flow until the rotary turbine elements approach a stabilized speed. I have further provided the throttle valve with a damping means for retarding the rate at which the fuel flow may be reduced during the manual actuation of the throttle linkage thereby preventing a flame "blow-out" in the burner during periods of rapid deceleration of the power plant.

A further object of my invention is to provide a fuel control system, as set forth in the preceding objects, which includes a bypass valve means for selectively exhausting fuel from the delivery side of a fuel pumping mechanism into a fuel reservoir thereby interrupting the flow of fuel to the gas turbine burner, said bypass valve means being adapted to be actuated by a suitable solenoid device which may be energized by the power plant ignition current.

In carrying forward the above objects, I have adapted the fuel control system of my present invention for installation in a gas turbine power plant of the automotive type, although it will readily be apparent that my invnvention is not limited to installations of this type. This power plant has been disclosed in the copending U.S. patent application of George J. Huebner et al., Serial No. 389,094, filed October 29, 1953, which is assigned to the assignee of my instant invention, and reference may be made thereto, if desired, for the purpose of supplementing my instant disclosure. The structural environment for my invention includes a rotary compressor unit and a two-stage turbine rotatably mounted in coaxial relationship with respect to the rotary compressor, one stage of the turbine being drivably coupled to the rotary compressor and the other stage being connected to a power output shaft for the power plant.

A power plant housing is provided for enclosing the compressor unit and the two-stage turbine within a central portion thereof, a burner unit being enclosed within another portion of the housing. The compressor unit is adapted to supply the burner with compressed air for supporting combustion of liquid fuel, the fuel being delivered to the combustion chamber of the burner structure through an air atomizing nozzle which will subsequently be described in particular detail. The burner is adapted to produce motive gases which are conducted through both stages of the two-stage turbine for powering the same. The gases are then exhausted through a suitable exhaust conduit structure to the exterior of the power plant. The power plant may be provided with a regenerator unit, if desired, for effecting a transfer of thermal energy from the exhaust gases to the compressed air supplied to the burner.

The fuel system of my invention incorporates a fuel-air pumping unit which includes separate working chambers for separately pumping both liquid fuel and air to the air atomizing nozzle of the power plant burner. The fuel may be supplied to the fuel-air pumping unit through suitable conduit means communicating with a fuel storage tank and the air may be supplied to the fuel-air pump through other conduit means communicating with the high pressure discharge portion of the rotary compressor unit. The fuel-air pumping unit may be powered by a suitable cam actuator which may be operatively connected through a suitable accessory drive means to the rotary compressor unit and one stage of the two-stage turbine.

I contemplate that the fuel discharge pressure of the fuel-air pumping unit will be a function of the pressure of the air being supplied to the air pumping portion of the unit which in turn is a function of the compressor speed. Further, the characteristics of the pumping unit are such that the difference between the fuel discharge pressure and the air inlet pressure for the pumping unit should remain substantially constant throughout the operating speed range of the engine.

Conduit means are provided for interconnecting the power plant compresser unit with the fuel pump to provide an increased total pressure on the fuel discharge side of the pumping unit.

The fuel system of my invention further includes a manually actuated throttle valve for selectively restricting the flow of fuel from the fuel pump to the air atomizing nozzle. The scheduling valve previously referred to may be interposed in series with the throttle valve in a downstream position with respect thereto. I have incorporated a diaphragm-type actuator with each of the fuel scheduling valves and have operatively connected the same to a movable valve element within each of the respective valves. A turbine speed sensitive governor pump may be drivably connected to one turbine stage and to the rotary compressor unit and may be adapted to supply actuating pressure to each of the actuators to energize the same. The fuel scheduling valves are therefore adapted to respond to variations in turbine speed to selectively and automatically control the supply of fuel to the power plant burner during periods of acceleration, this supply of fuel being made available by the fuel pump at varying rates as determined by the position of the manually adjustable throttle valve.

I contemplate that variations in pressure within the burner will be accompanied by corresponding changes in pressure at the discharge side of the fuel pumping unit.

I will more specifically describe these features together with other unique features of my invention with reference to the accompanying drawings wherein:

Figure 1 is a composite sectional view showing a gas turbine assembly with which my present invention is particularly adapted to be used;

Figure 2 is a transverse sectional view taken along section line 2—2 of Figure 1, a portion thereof being shown in elevation;

Figure 3 is a sectional view showing a portion of the accessory drive for the power plant of Figure 1 and is taken along the section line 3—3 of Figure 2;

Figure 4 is a sectional view of the fuel-air pumping unit and accessory drive taken along the section line 4—4 of Figure 3;

Figure 5 is a schematic spacial representation of the components of the accessory drive of the power plant in Figure 1; and Figure 6 is a schematic representation of the components of the automatic fuel control mechanism.

Having reference first to the power plant shown in Figure 1, a centrifugal compressor is generally designated by numeral 10. A circular intake passageway is provided at 12 on the upstream side of the compressor 10 and it comprises an outwardly diverging air conduit having a reverse curve configuration partly defined by an outer housing plate 14. A finned type oil cooler may be provided at 13, if desired, in the intake passageway for cooling the lubricating oil for the power plant. The power plant housing is generally designated by numeral 16 and the plate 14 may be secured thereto by suitable ribs 18. The fuel control and accessory drive gear is generally designated in Figure 1 by numeral 20 and is covered by a suitable cover plate 22 which may be bolted to the plate 14, as shown at 24.

A converging air intake passageway 12 extends axially at a radially inward portion thereof and is effective to conduct intake air to the mouth of a bladed inducer assembly 24 for the centrifugal compressor unit 10. A rotor portion 26 for the compressor unit 10 receives the intake air from the inducer 24 and discharges the same radially from rotor blades 28 as the compressor assembly 10 revolves about its geometric axis. The discharged air is then received within an intake portion 32 of a spiral diffuser structure shown at 30.

The diffuser 30 comprises a chamber defined by a portion of the housing 16, said chamber progressing spirally about the axis of the compressor 10. The cross sectional area of the diffuser chamber increases progressively from the radially inward inlet portion 32 to a radially outward domed chamber 34 situated on the upper portion of the housing 16.

The high pressure intake air is then caused to pass through a matrix structure 36 of a rotary regenerator unit 38 which may be rotatably mounted within an upper portion of the housing 16, as shown in Figure 1, upon a suitable bearing structure 40.

Referring next to Figure 2, the compressed air is heated as it passes through the regenerator matrix 36 and is collected in chamber 40. Suitable baffle and wall structure may be provided as shown for conducting this heated air into the region 42 surrounding the burner cone 44. The burner 44 is provided with a plurality of openings 46 for admitting air into the interior thereof for supporting combustion of liquid fuel supplied by a fuel-air nozzle 48, which may be situated within the upper portion of the burner cone as shown. Suitable baffle structure 50 may be provided for conducting the combustion gases radially inward to region 52 situated adjacent one axial end of a two-stage turbine unit generally designated by numeral 54. The region 52 is defined by an auxiliary baffle structure 56 which may be suitably secured to the end of baffle structure 50, as shown in Figure 2.

Referring again to the assembly view of Figure 1, the turbine unit 54 includes a first and a second stage turbine wheel 58 and 60 which may be rotatably journalled as shown in coaxial adjacent relationship. Suitable bearing structure 62 may be provided, as shown in Figure 1, for rotatably journalling the turbine wheel 58 within an axially extending portion 64 of the power plant housing 16. A turbine shaft spacer element 66 is provided, as shown in Figure 1, to connect the turbine wheel 58 with the compressor rotor member 26. A turbine shaft 68 may be provided for interconnecting the turbine wheel 58 with the hub of the centrifugal compressor unit 10 and for maintaining the turbine wheel 58, spacer 66, and the elements of the centrifugal compressor 10 in coaxial stacked relationship. Bearing structure may be provided at 69 for rotatably supporting the compressor unit 10.

A suitable shroud structure 70 is disposed about the outer periphery of each of the turbine wheels 58 and 60 and is effective to partly define an annular passageway for conducting combustion gases through the bladed peripheries of the turbine wheels 58 and 60. Stator blades may be positioned within the shroud structure 70 adjacent each of the bladed peripheries of the turbine wheels 58 and 60 on the upstream side thereof, as shown at 72 and 74.

The turbine wheel 60 may be rotatably journalled in an end portion of the power plant housing 16 within a suitable bearing structure 76 and may be drivably secured to an end of a central turbine shaft 78 which extends axially to the power transmission structure 80 and which may be positively connected to a power input pinion 82 of the transmission 70. A power output shaft for the transmission 80 is shown in Figure 1 at 84 and is situated so that it may be immediately connected to the drive shaft of a wheeled automotive vehicle.

Energy is imparted to the turbine wheels 58 and 60 by the motive combustion gases for respectively powering the compressor 10 and for delivering power to the transmission output shaft 84. The motive combustion gases enter the region 86 after passing through the turbine unit 54 and then pass through a portion of the regenerator matrix 36 to an exhaust chamber 88 situated on the upper portion of the power plant housing 16. A portion of the thermal energy of the exhaust gases is thereby transferred through a section of the regenerator matrix 36 which causes an increase in the temperature of this matrix section. A suitable exhaust passage means may be provided for conducting the exhaust gases from the chamber 88.

The accessory drive 20 includes a pinion member 90, Figures 2 and 5, which is positively connected to the rotatably mounted compressor unit 10 in coaxial relationship therewith. A second gear 92 is adapted to be interengaged with the pinion 90 and is secured to a shaft 94 which is rotatably mounted within the cover 14 for the compressor inducer structure. Another pinion 96 is secured to the shaft 94, is adapted to rotate with the gear 92 and is interengaged with another large reduction gear 98 suitably secured to shaft 100.

The shaft 100 extends in an axial direction away from the compressor inducer structure and as best seen in Figures 3 and 4, is rotatably journalled in a wall 102 by suitable needle bearings 104. A bracket 102 is integrally formed with a base plate 106 which may be secured to the bottom surface 108 of a wall extension 110 by suitable bolts 112. Suitable bosses 114 may be provided, as shown in Figures 3 and 4, for threadably receiving the bolts 112. The wall extension 110 forms an integral part of the power plant housing 16 and is effective to partly define an enclosure for portions of the accessory drive mechanism.

The shaft 100 is provided with an extension 116 which may be rotatably journalled within an auxiliary bracket portion 118 by needle bearings 120. A drive gear 122 is keyed to the shaft extension 116 intermediate the needle bearings 104 and 120 and is drivably engaged with an idler gear 124 keyed to an oil pump driveshaft 126. The shaft 126 is rotatably journalled within the bracket 102 by needle bearings 128 and by needle bearings 130 mounted in an oil pump housing structure 132, the bearings 128 and 130 being disposed on opposite sides of the gear 124.

An oil pump housing 132 encloses a pair of interengaged oil pump gears 134 and 136 respectively, the external gear 136 being drivably connected to the shaft 126 by means of a splined connection 138. Suitable outlet and inlet ports of the oil pump assembly are provided but are not specifically shown, and suitable oil passages may be connected thereto for conducting oil to various locations within the engine for lubrication purposes.

Another pinion 140 is rotatably journalled within another portion of the bracket 102 by means of a suitable bushing 142 and is driveably engaged with the idler gear 124. The pinion 140 is splined, as shown at 146, to one end of a speed sensor pump shaft 144. The other end of the speed sensor pump shaft 144 is rotatably journalled by means of bushings 148 within a second bracket 150 secured to base plate 106 and situated in a plane which is substantially parallel to the plane of the bracket 102, the bracket 150 and the bracket 102 forming an integral assembly with the common base 106. The bracket 150 receives a speed sensor pump rotor 152 within a cylindrical recess 154 formed within one side of the bracket 150.

The speed sensor pump rotor 152 is cylindrical in shape and is provided with radial passages 156 which interconnect a peripheral groove 158 formed in the cylindrical recess 154 and an axially extending fluid passage 160 in the shaft 144. A fluid reservoir is in communication with one end of the passage 160 and is adapted to accommodate a supply of fluid therein. Suitable conduit means may be provided for conducting fluid pressure from the peripheral groove 158 to the fluid control valve structure, which will subsequently be described in detail, thereby providing a speed signal for initiating certain predetermined responses of the fuel control valve mechanism.

A starter generator unit 164 for the presently disclosed power plant may be bolted to flange 166 formed on the power plant housing 16 and housing extension 110, as shown in Figure 3. An armature shaft 168 for the starter generator unit may be coupled to the speed sensor pump rotor 152 by means of a coupling assembly 170.

The coupling assembly 170 comprises an adaptor 172 splined to the end of shaft 168 and provided with a pair of lugs 174. The speed sensor pump rotor 152 may be similarly provided with a pair of lugs 176, the lugs 174 and 176 being disposed at 90° with respect to each other. A floating disc 178 is provided with radial slots located at 90-degree increments, two opposed radial slots being adapted to receive the lugs 176 of the pump sensor rotor 152 and the remaining two opposed radial slots being adapted to receive lugs 174 of the adaptor 172. The driving connection thus provided by the coupling structure 170 is adapted to compensate for any slight misalignment of the axes of the pump sensor rotor and the armature shaft 168.

Referring more particularly to Figure 4, the gear 124 is shown in driving engagement with a gear 178 secured to a shaft 180. A helical gear 182 is positively connected to the same shaft 180 and is adapted to rotate with gear 178. A pair of interengaged, crossed axis helical gears 182 and 184 are mounted as shown, the gear 182 being provided with a hub 186 adapted to be rotatably journalled by needle bearings 188 within an auxiliary bracket structure 190 which bridges the space between the parallel brackets 102 and 150. A vertically extending shaft 192 is splined at 194 to the gear 184 and extends through a sleeve 196 to the upper portion of the power plant housing 16, the sleeve 196 forming a portion of the housing 16. The upper end of the shaft 192 is journalled in the housing 16 by suitable bearings 198 and it carries a driving pinion 200 which driveably engages a ring gear 202 formed about the periphery of the rotary regenerator 38.

A ring gear 202 may best be seen in Figures 1 and 2 and it comprises a portion of the regenerator rim structure which encircles regenerator matrix 36.

An eccentric cam element 204 is secured to the gear 178 to rotate therewith.

A fuel-air pumping unit, generally designated by numeral 206, is externally secured to the housing extension 110, as shown in Figure 4, and it includes a rocker arm 208 which is pivoted at 210 to a portion of the fuel-air pump housing 212. The arm 208 extends externally of the fuel-air pump housing 212 through aperture 214 formed in the housing extension 110. The end of the rocker arm 208 is provided with a cam follower surface 216 which is adapted to slidably contact the peripheral surface of the eccentric cam element 204. The rocker arm 208 is provided with an extension 218 disposed within the interior of the housing 212 and is biased in a downward direction by a spring 220 seated on an upper housing portion 222 secured to the top of the fuel-air pump casting 212.

The extension 218 is adapted to contact the end of a vertically disposed shaft 224 slidably received through the upper housing portion 222. A pump cover housing portion 226 is mounted on top of the housing portion 222 and is secured thereon by suitable bolts 228. A diaphragm structure 230 is disposed transversely across the upper portion of the fuel-air pumping unit and is secured between the mating surfaces of the mating housing portions 222 and 226. Housing portion 226 defines a hollow working chamber 232 within which a compression spring 234 may be mounted. The air diaphragm structure 230 includes a suitable spring seat against which the spring 234 is seated. The upper housing portion 222 is recessed to define a working chamber, as shown at 236, below the air diaphragm structure 230. The vertical shaft 224 is secured to the central portion of the air diaphragm structure 230 and is adapted to deflect the same against the force exerted by the compression spring 234 upon rotary movement of the rocker arm extension 218 about the pivot point 210. Suitable air outlet and inlet check valves 236a and 236b respectively are provided for working chamber 236, Figure 4. Conduit means 408 is provided for connecting the interior of the diffuser 30 of the centrifugal compressor unit 10 with the intake of the working chamber 236 for supplying the same with high pressure intake air during the operation of the power plant. Other conduit means 402 is provided for interconnecting the exit of the working chamber 236 with the fuel-air nozzle 48.

A lower fuel-air pump housing portion 238 may be secured to the lower surface of the housing portion 212 by suitable bolts 240 and a fuel diaphragm structure 242 may be secured between the mating upper and lower surfaces of the housing portions 238 and 212, respectively. A vertically extending shaft 244 extends through the housing portion 212 and is adapted to be vertically oscillated therein by the rocker arm extension 218 during rotatable oscillation of the extension 218 about the pivot point 210. The housing portion 238 is recessed to a define a liquid fuel working chamber 246 below the diaphragm structure 242. The lower end of the shaft 244 is operatively secured to the diaphragm structure 242 and is effective to deflect the same against the biasing force of a spring 248 interposed between the diaphragm structure 242 and the housing portion 212. Suitable valve controlled intake and outlet ports may be provided in the working chamber 246 for respectively receiving liquid fuel from a suitable fuel storage means and for delivering high pressure liquid fuel to a suitable delivery passage means, the latter means being in communication with the fuel-air nozzle 48 of Figure 2.

Referring next to Figure 5, a three-dimensional schematic representation of the above-described accessory drive mechanism is shown in detail. It will be apparent from a casual inspection of Figure 5 that as the motive gases drive the bladed turbine wheel 58, the compressor unit 10 and the accessory pinion 90 are caused to rotate about the axis of the turbine shaft 68. Pinion 90 is effective to drive the idler gear 92 and the pinion 96, both of which are secured upon the common shaft 94. The pinion 96 in turn drives the gear 98 and the pinion 122 which are secured to the common shaft 100. The pinion 122 in turn drives the gear 124 and the oil pump gear 136 which are secured to the common shaft 126. The gear 124 is adapted to drive the speed sensor pump gear 140 and the gear 178, the latter gear being secured to shaft 126. The cross axis helical gears 182 and 184 are secured to the shaft 126 and the shaft 192, respectively, thereby powering the gear 200 which in turn engages and drives the ring gear 202 and the associated regenerator structure 38 about the bearing structure 40, as previously described.

The gear 140, which is driven by the gear 124, in turn drives the pump sensor rotor 152 coupled to the armature of the starter generator unit 164.

The eccentric cam element 204 turns integrally with the gear 178 and is adapted to oscillate the arm 208 during the operation of the power plant thereby producing successive and alternate intake strokes for the fuel and the air pumping chambers of the fuel-air pumping unit 206. The working strokes for the fuel and air pumping chambers are produced under the influence of the compression springs 248 and 234, respectively.

Referring next to Figure 6, I have shown a schematic representation of the fuel control valve arrangement and it includes four principal valve components shown at 250, 252, 254, and 256 respectively. These four valve elements may be incorporated, if desired, within a single valve body casting, the outline of which I have shown schematically by means of a dotted line enclosure at 258.

I have designated the valve 250 as a throttle valve and it comprises a valve insert 260 received within a bore 262 in the valve body 258. The insert 260 includes a pair of annular recesses 264 and 266 respectively, the former communicating with a central bore 268 in the insert 260 through a plurality of openings 270 in the recessed portion 264 and the latter communicating with the central bore 268 through a plurality of axially spaced openings 272. A valve plunger 274 is slidably received within the bore 268 and it includes a reduced diameter section 276 intermediate the large diameter end portions 278 and 280, respectively. The large diameter portion 278 is adapted to progressively restrict the openings 272.

The end of the large diameter portion 278 of the plunger 274 carries a spring seat 282 near the end of the bore 262 and a closure member 284 is inserted within the end of bore 262, the closure member 284 also having a spring seat portion 286. I have interposed compression spring 288 between the spring seats 282 and 286 for normally biasing the plunger 274 to the right as viewed in Figure 6. I have formed a hollow chamber 290 within the valve body 258 at the other end of the bore 262 and have adapted the same to accommodate therein a throttle linkage lever 292 which is pivoted at 294 and which is adapted to slidably actuate the plunger 274 within the bore 268 of the insert 260.

I prefer to designate the valve 252 as the "schedule and idle governor valve," and the structure thereof is substantially similar to that of the throttle valve 250. The valve 252 includes an insert 296 which I have secured within a bore 298 formed in the valve body 258. I have provided the insert 296 with a central axially extending bore 300 within which a plunger rod 302 is slidably disposed. Large diameter portions 304 and 306 of the rod 302 are adapted to progressively restrict a plurality of valve openings at 308 and at 310, respectively, formed in the valve insert 296 in the vicinity of annular recesses 312 and 314, respectively. I have inserted a spring means 316 within one end of the bore 298, as shown, for biasing plunger rod 302 to the right, as viewed in Figure 6. I have further provided a spring seat at 318 which may be adjusted axially by means of a threaded stem 320 thereby adjusting the compression force of the spring means 316. The stem 320 is threadably received through a closure member 322 and a protective cap 324 may be threadably received over the outer end of closure member 322.

I prefer to designate the valve 254 as "the accelerating schedule and overspeed governor valve," and the structure thereof is substantially similar to that of the valve 252. Valve 254 includes a plunger 326 having large diameter portions 328 and 329 which are adapted to progressively restrict the valve ports 330 and 332, respectively, formed in a valve insert 333. I have provided a spring means 334 for biasing the plunger rod 326 to the right as viewed in Figure 6.

The valves 252 and 254 are each provided with plunger rod actuators 337 and 338, respectively, for axially adjusting the position of the plunger rods 302 and 326 during the operation of the power plant. The actuator 337 comprises the flexible diaphragm 340 which I have disposed transversely across an interior chamber 342 situated within a portion of the valve body 258. An adaptor 344 is carried by the end of the large diameter portion 306 of the plunger rod 302 and I have secured the same in a suitable manner to the central portion of the flexible diaphragm 340.

The corresponding structure of the actuator 338 includes a flexible diaphragm 346, a chamber 348, and a plunger rod adaptor 350. A passage 352 is provided, as shown, for interconnecting the portions of the chambers 342 and 348 on the left side of the diaphragms 340 and 346, respectively. The other portions of the chambers 342 and 348 to the right of the diaphragms 340 and 346, respectively, as shown in Figure 6, communicate with the high pressure annular groove 158 about the periphery of the speed sensor rotor 152 through the fluid passage 354 and branch passages 356 and 358.

I have extended a fluid passage 360 from the chamber 348 on the left side of the diaphragm 346 to the chambers occupied by the valve springs 334, 316, and 288 of the valves 254, 252, and 250 respectively. I have interposed a fluid restricting orifice 361 in the fluid passage 360 between the valve 250 and the valve 252. The annular recess surrounding the valve openings 330 of the valve 254 is in fluid communication with the annular recess surrounding valve openings 272 of the valve 250 through fluid passage 362. The annular recess surrounding valve openings 310 of the valve 352 and the annular recess surrounding the valve openings 332 of the valve 254 are in fluid communication with fluid passage 360 by means of fluid passage 364. The chamber 342 on the left of the flexible diaphragm 340 is in fluid communication with the chamber 290 through fluid passage 366.

The fuel-air pump unit 206 is provided with a liquid fuel outlet passage means 368 which communicates with the annular recess 264 surrounding the openings 270 in the throttle valve 250 and with the annular recess surrounding the valve openings 308 in the valve 252. The fuel-air pump 206 is also provided with a liquid fuel intake passage 370 which communicates with a fuel tank which is schematically shown at 372. A suitable filter element 374 may be provided, if desired, in the intake passage 370 on the upstream side of the fuel-air pump 206. A fuel return passage 376 is adapted to interconnect the fuel storage tank 372 and the fluid passage 360, as shown.

I prefer to refer to the valve 256 as a "bypass valve," said valve comprising a flexible diaphragm 378 which may be operatively secured to and actuated by a solenoid armature shaft 380. I have shown at 382 a solenoid actuator which is adapted to be threadably secured to the valve body 258. I have adapted the solenoid 382 to move the armature shaft 380 in a vertically downward direction, as viewed in Figure 6, when energized by ignition current for the power plant. Upon being deenergized, the solenoid 382 is effective to retract the armature shaft 380 thereby causing the diaphragm 378 to become unseated from a valve seat 384 forming a portion of the "bypass valve" structure. A fluid passage 364 is in fluid communication with passage 360 in the vicinity of the valve seat 384. It is thus apparent that the bypass valve 256 will selectively open and close the fluid passage 364 in the vicinity of the valve seat 384 as the power plant ignition system is energized and deenergized. The air atomizing nozzle 48, which was previously referred to in connection with the description of the structure of Figure 2, includes a substantially cylindrical body portion 386 provided with an internally threaded central opening 388 which is adapted to threadably receive a nozzle insert member 390. The insert member 390 is provided with an axial fluid passageway 392 in fluid communication at one end thereof with a fluid delivery passage 394. The passage 394 is in fluid communication with the fluid passage 364 through a one-way check valve element 396. The other end of the passage 392 in the nozzle member 390 communicates with fuel mixing ports 395 through a plurality of branch passages 396, the mixing ports 395 in turn being in communication with the nozzle exit opening 398.

An annular space 400 is provided, as shown, within the interior 388 of the nozzle body 386 and is in communication with the air exit port of the fuel-air pump 206 through an air conduit 402. The air from the annular space 400 communicates with the mixing ports 394 through axially extending passages 404 and 406. An air inlet passage is schematically shown in Figure 6 at 408 and is effective to supply the fuel-air pump with compressed intake air from the diffuser 30 of the centrifugal compressor unit 10. One branch 408a, Figure 4, of the passage 408 communicates with the air pump working chamber via check valve 236b. A second branch 408b communicates with the chamber which houses spring 248, so as to supplement the fuel pumping action of the latter. Thus as explained above, the fuel discharge pressure of the pumping unit will be a function of the inlet air pressure, and the differential between the fuel discharge pressure of the pumping unit and the inlet air pressure will remain substantially constant throughout operation of the engine.

When the engine is inoperative and when the ignition current is interrupted, the valve elements of the control valve system are in the position as shown in Figure 6. To start the power plant, the operator turns the ignition key to the "start" position thereby energizing the solenoid 382 which causes the bypass valve 256 to close thereby blocking fluid communication between fluid passages 360 and 364. The ignition current is also effective to energize the starter generator unit 164 thereby enabling the same to accelerate the turbine wheel 58 and the compressor unit 10 through the accessory drive provided by gears 140, 124, 122, 98, 96, 92, and 90 as best seen from my schematic representation of Figure 5. The rotating gear 124 is thereby effective to drive the gear 178 and the eccentric cam element 204 which in turn causes the rocker arm 208 of the fuel-air pump unit 206 to oscillate. Air is thereby caused to be delivered to the air atomizing nozzle 48 through the air delivery passage 402. Simultaneously, high pressure fuel is caused to be pumped through the fuel delivery passage 368 through the annular space 264 of valve 250 to the annular space 312 of the valve 252. The fuel will be metered through the opening 308 in the valve insert 296 to the central bore 300 and will then pass through the valve openings 310 into the annular recess 314. The annular recess 314 is in fluid communication with the fuel delivery passage 394 through the fluid passage 364. It is thus apparent that the fuel pump will be effective to deliver a controlled quantity of fuel to the central opening 392 of the nozzle 48.

The speed sensor rotor 152 is also caused to rotate and to increase the pressure in the annular groove 158 and the passage 354 to a value which is proportional to the speed of the turbine wheel 58. The pressure in the passage 354 is delivered to the right side of the diaphragm 340 thereby causing the plunger rod 302 to be adjusted axially to progressively open the valve openings 308 thereby permitting an increased flow of fuel from the passage 368 to the passages 364 and 394. The valve 252 is therefore effective to schedule a predetermined flow of fuel to the nozzle 48 during acceleration of the power plant up to idling speed, which may be in the vicinity of 20,000 r.p.m. At speeds greater than idling speed, the speed sensor pump pressure will be sufficiently great to cause the plunger rod 302 to be moved against the biasing force of spring 316 until the large diameter portion 396 of the plunger rod 302 blocks the valve opening 310 thereby interrupting communication between the fluid passages 368 and 364 and accordingly interrupting flow of fuel to the nozzle 48. The valve 252 is therefore adapted to schedule fuel flow to the nozzle 48 during the period of acceleration from start up to idling speed and also to act as a speed governor means for maintaining a substantially constant idle speed once this speed has been attained.

To accelerate the engine after idle speed has been obtained, the throttle linkage may be actuated so that the throttle linkage element 292 adjusts the plunger rod 274 against the force of the compression spring 288 in the throttle valve 250 thereby progressively opening the valve ports 272 to permit the flow of fluid from the delivery passage 368 to the passage 362. The annular chamber surrounding the valve ports 330 of the valve 254 is in communication with fluid passage 362. At power plant speeds below idling speed, the spring 334 is effective to maintain the large diameter portion 328 of the plunger rod 326 in the closed position, and as the power plant speed increases from idling speed and approaches the maximum speed, the valve ports 330 are progressively opened as the actuator 338 moves the plunger rod 326 against the force of the spring 334.

As the plunger rod 274 of the throttle valve 250 is moved progressively toward the wide open position against the force exerted by the spring 288, an increased quantity of fuel will be made available to the passage 362. The valve 254 will prevent this increased quantity of fuel from being immediately delivered to the fuel nozzle 48. That is, the flow is retarded until the fuel requirements of the power plant and the power plant speed are of sufficient magnitude so that this increased quantity of fuel may be efficiently utilized. The valve 254 will schedule the fuel flow in this manner until the throttle valve 250 reaches the wide open position.

If the power plant speed exceeds a predetermined maximum value, the plunger rod 326 will be moved axially against the force exerted by the spring 334 until the large diameter portion 329 of the plunger rod 326 blocks the valve openings 332 thereby interrupting flow of fuel from the passage 362 to the passage 364, to the passage 394 and to the nozzle 48. Valve 254 therefore has the double function of scheduling the fuel flow during the acceleration period and of providing a governor means for preventing overspeeding of the engine.

The passages 360, 352, and 366 provide fluid communication between opposite sides of each of the valves 250, 252, and 254. Therefore when the plunger rods 274, 302, or 326 are shifted axially, the fluid displaced from one side of the respective valves may be transferred to the opposite side. The orifice 361 interposed in the passage 360 between the valves 250 and 252 is effective to retard the flow of fluid into the spring chamber for spring 288 as the plunger rod 274 is shifted axially to the right by the throttle linkage mechanism. During deceleration of the engine, the throttle linkage element 292 is rotated in a counterclockwise direction, as viewed in Figure 6, and the spring 288 is effective to shift the plunger rod 274 so that the large diameter portion 278 will progressively close the valve openings 272 thereby causing fuel to simultaneously enter the spring chamber for the spring 288 through the restricted orifice 361. The restriction offered by the orifice 361 to this flow of fluid retards the rate at which the plunger rod portion 278 closes the valve openings 272 thereby preventing a flame "blow-out" in the power plant burner during rapid deceleration of the power plant.

The hollow chamber 290, which accommodates the throttle linkage lever 292, includes a flexible surge diaphragm 410 disposed transversely across the interior of the chamber 290. If desired, the diaphragm 410 may form a portion of the diaphragm 337 and 338. The chamber portion on the left side of the diaphragm 410 is filled with liquid fuel and is in fluid communication with the bypass passage 360, chamber 342 and chamber 348 as previously described. The chamber portion on the right side of diaphragm 410 contains air and a flow retarding orifice is provided at 412 for accommodating the flow of air therethrough. The diaphragm 410, the air chamber on the right side of the same and the orifice 412 constitute a dashpot for damping any oscillations or periodic pressure impulses which might be created in the fluid circuit comprising the bypass passage 360, the chamber 342, and the chamber 348. The diaphragm 410 further is adapted to compensate for the displacement of the rod 274 as it is shifted axially.

To stop the power plant, the ignition current may be interrupted by a suitable ignition switch and the solenoid 382 therefore becomes deenergized. This in turn causes the solenoid shaft 380 to become retracted and to unseat the diaphragm 378 of the bypass valve 256 from the valve seat 384. Any fuel which may thereafter be delivered by the fuel-air pump 206 will be bypassed from the passage 364 to the passage 360 and then to the connecting passage 376 to the fuel tank 372. The one-way check valve 396 is effective to prevent fuel from draining from the nozzle 48 back into the fuel-air pump supply circuit after the engine has been turned off. In the event that a residual pressure exists in the system after the engine has been turned off, the one-way check valve 396 is also effective to prevent this pressure from producing dripping or dribbling of liquid fuel at the nozzle 48.

I contemplate that the fuel control system of my present invention might be successfully modified by providing one or several slotted openings or the like in the valve inserts 269, 296, and 333 in place of the plurality of valve openings 270, 308, and 330, respectively. Similarly, the valve openings 310 and 333 may be replaced by a single valve opening or a plurality of slotted valve openings as desired.

I anticipate that various other modifications may readily be made without departing from the scope of my present disclosed invention as defined by the following claims.

1. In a gas turbine engine having rotary turbine elements and a burner for producing motive gases for powering said turbine elements, and a compressor means for supplying intake air to said burner under pressure: a fuel control system comprising a fuel pumping mechanism, conduit structure interconnecting said pumping mechanism and said burner, an air conduit means connecting said compressor means and portions of said pumping mechanism for subjecting the latter to said pressure, a valve assembly including at least one fuel scheduling valve and a manually actuated throttle valve; each of said valves comprising a valve housing, said housing defining a valve chamber; a hollow valve sleeve secured within said chamber, a movable valve element slidably disposed in said hollow sleeve and extending from one end of said chamber, valve ports formed in said valve sleeve for accommodating a flow of fuel therethrough, said movable valve element being adapted to progressively restrict said ports upon relative movement between said movable valve element and said valve sleeve, and a spring means disposed within the other end of said chamber for biasing the valve element toward said one end of said valve chamber; a fluid chamber formed adjacent said one end of each of the valve chambers, a flexible diaphragm extending transversely across one of said fluid chambers, one of said movable valve elements being secured to said diaphragm, a speed sensor device drivably connected to said turbine elements and adapted to provide a source of fluid pressure, the magnitude of said fluid pressure being proportional to the speed of said turbine elements, and conduit means for conducting said fluid pressure to one side of said diaphragm to adjust the position of said one movable valve element in response to variations in turbine speed.

2. The combination as set forth in claim 1 wherein passage means are provided for interconnecting the other ends of said valve chambers with each other, for interconnecting said fluid chambers with each other, and for interconnecting said other ends of said valve chambers with said fluid chambers.

3. The combination as set forth in claim 2 wherein a surge diaphragm is disposed transversely across another of said fluid chambers, said surge diaphragm partly defining a variable volume surge chamber, said surge chamber being gas filled and provided with a restricting orifice for damping movement of said surge diaphragm, said surge chamber being effective to dampen pressure fluctuations in said fluid chambers, in said valve chambers and in said passage means.

4. The combination as set forth in claim 2 wherein a metering orifice is provided in said passage means between said two valve chambers for restricting the flow of fuel therethrough thereby retarding movement of the other of said movable valve elements in one axial direction.

5. The combination as set forth in claim 1 wherein another of said fluid chambers houses a manually actuated linkage element, said linkage element being adapted to axially adjust the position of said other movable valve element thereby selectively throttling the flow of fuel to said burner, said one movable valve element and said flexible diaphragm being adapted to retard the flow of throttled fuel to said burner until the turbine elements are accelerated and assume a stabilized speed.

References Cited in the file of this patent
UNITED STATES PATENTS

| | | |
|---|---|---|
| 1,032,339 | Matthews | July 9, 1912 |
| 2,396,643 | De Ganahl | Mar. 19, 1946 |
| 2,545,698 | Holley et al. | Mar. 20, 1951 |
| 2,557,526 | Bobier et al. | June 19, 1951 |

(Other references on following page)

UNITED STATES PATENTS

| | | | |
|---|---|---|---|
| 2,581,275 | Mock | Jan. 1, | 1952 |
| 2,604,756 | Greenland | July 29, | 1952 |
| 2,616,508 | Mock | Nov. 4, | 1952 |
| 2,667,743 | Lee | Feb. 2, | 1954 |
| 2,670,725 | Cummins | Mar. 2, | 1954 |
| 2,686,561 | Isreeli et al. | Aug. 17, | 1954 |
| 2,688,229 | Lee | Sept. 7, | 1954 |
| 2,819,588 | Sarto | Jan. 14, | 1958 |

FOREIGN PATENTS

| | | | |
|---|---|---|---|
| 1,077,684 | France | May 5, | 1954 |
| 411,053 | Germany | Mar. 23, | 1925 |
| 585,029 | Great Britain | Jan. 29, | 1947 |
| 585,032 | Great Britain | Jan. 29, | 1947 |